(12) United States Patent
Laugier et al.

(10) Patent No.: US 10,767,924 B2
(45) Date of Patent: Sep. 8, 2020

(54) METHOD FOR FRACTIONATING A STREAM OF CRACKED GAS TO OBTAIN AN ETHYLENE-RICH CUT AND A STREAM OF FUEL, AND RELATED INSTALLATION

(75) Inventors: Jean-Paul Laugier, Paris (FR); Yvon Simon, Andresy (FR)

(73) Assignee: TECHNIP FRANCE (FR)

( * ) Notice: Subject to any disclaimer, the term of this patent is extended or adjusted under 35 U.S.C. 154(b) by 1494 days.

(21) Appl. No.: 13/503,697

(22) PCT Filed: Oct. 26, 2010

(86) PCT No.: PCT/FR2010/052290
§ 371 (c)(1),
(2), (4) Date: Jul. 2, 2012

(87) PCT Pub. No.: WO2011/051614
PCT Pub. Date: May 5, 2011

(65) Prior Publication Data
US 2012/0266630 A1    Oct. 25, 2012

(30) Foreign Application Priority Data

Oct. 27, 2009  (FR) ..................................... 09 57537

(51) Int. Cl.
*F25J 1/02* (2006.01)
*F25J 3/06* (2006.01)
(Continued)

(52) U.S. Cl.
CPC .............. *F25J 3/062* (2013.01); *F16D 21/00* (2013.01); *F25J 3/0219* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,721,099 A * | 3/1973 | Forg | ................................ 62/612 |
| 4,496,381 A | 1/1985 | Norenburg | |

(Continued)

FOREIGN PATENT DOCUMENTS

| | | |
|---|---|---|
| CN | 1046729 | 11/1990 |
| CN | 1241991 | 1/2000 |
| EP | 1 215 459 | 6/2002 |

OTHER PUBLICATIONS

Hurstel X et al., "Refrigeration schemes serve olefin plant needs", Oil and Gas Journal, pp. 107-123, XP009047287 (1981).
(Continued)

*Primary Examiner* — John F Pettitt, III
(74) *Attorney, Agent, or Firm* — Ostrolenk Faber LLP

(57) ABSTRACT

This method includes introducing a downstream stream (140) of cracked gas from a downstream heat exchanger (58) in a downstream separator (60) and recovering, at the head of the downstream separator (60), a high-pressure fuel gas stream (144).

The method includes the passage of the stream (144) of fuel through the downstream exchanger (58) and an intermediate exchanger (50, 54) to form a reheated high-pressure fuel stream (146), the expansion of the reheated high-pressure fuel stream (146) in at least a first dynamic expander (68) and the passage of the partially expanded fuel stream (148) from the intermediate exchanger (50, 54) in a second dynamic expander (70) to form an expanded fuel stream (152).

The expanded fuel stream (152) from the second dynamic expander (70) is reheated in the downstream heat exchanger (58) and in the intermediate heat exchanger (50, 54).

9 Claims, 1 Drawing Sheet

(51) Int. Cl.
*F25J 3/02* (2006.01)
*F16D 21/00* (2006.01)
*F16D 23/14* (2006.01)

(52) U.S. Cl.
CPC ..... *F16D 2023/141* (2013.01); *F25J 2205/04* (2013.01); *F25J 2270/02* (2013.01); *F25J 2270/04* (2013.01); *F25J 2270/06* (2013.01); *F25J 2290/34* (2013.01)

(56) References Cited

U.S. PATENT DOCUMENTS

| | | | |
|---|---|---|---|
| 4,629,484 A | | 12/1986 | Kister |
| 4,664,687 A | | 5/1987 | Bauer |
| 4,714,487 A | * | 12/1987 | Rowles ............................ 62/627 |
| 5,205,134 A | * | 4/1993 | Gistau-Baguer .......... F25B 9/06 |
| | | | 62/335 |
| 5,421,167 A | | 6/1995 | Verma |
| 5,768,913 A | | 6/1998 | McCue, Jr. et al. |
| 2002/0198430 A1 | | 12/2002 | Kaiser et al. |
| 2004/0237581 A1 | * | 12/2004 | Paradowski .................... 62/620 |
| 2009/0112037 A1 | | 4/2009 | Reyneke et al. |
| 2010/0263405 A1 | * | 10/2010 | Durand .................... F25B 1/10 |
| | | | 62/510 |

OTHER PUBLICATIONS

Examination Report dated Jul. 29, 2010 issued in connection with corresponding French patent application No. FR 09 57537.

\* cited by examiner

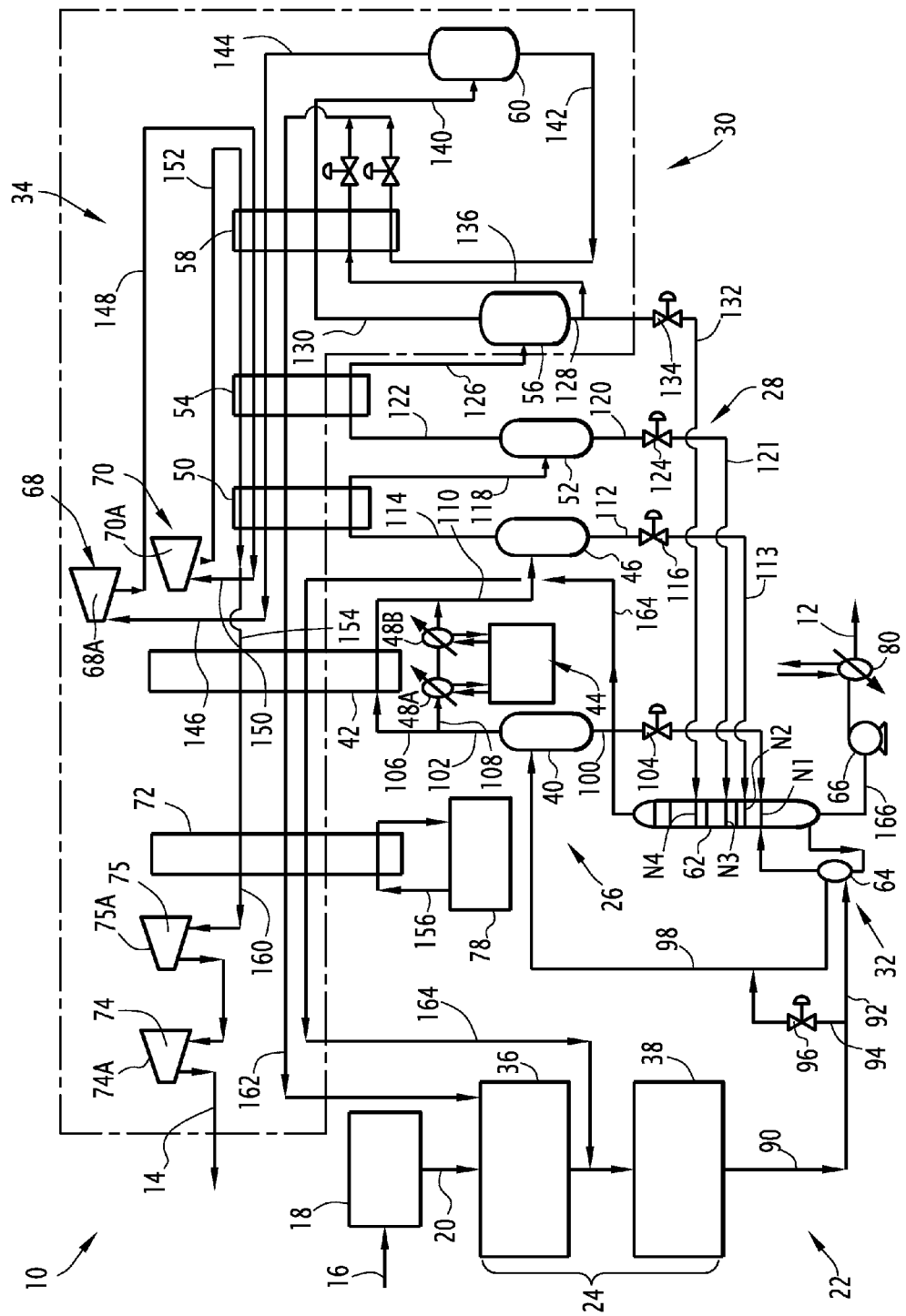

METHOD FOR FRACTIONATING A STREAM OF CRACKED GAS TO OBTAIN AN ETHYLENE-RICH CUT AND A STREAM OF FUEL, AND RELATED INSTALLATION

CROSS-REFERENCE TO RELATED APPLICATIONS

The present application is a 35 U.S.C. § 371 national phase conversion of PCT/FR2010/052290, filed Oct. 26, 2010, which claims priority of French Patent Application No. 09 57537, filed Oct. 27, 2009, the contents of which are incorporated herein by reference. The PCT International Application was published in the French language.

The present invention concerns a method for fractionating a stream of cracked gas from a hydrocarbon pyrolysis installation to obtain an ethylene-rich cut and a stream of fuel having a low $C_2^+$ hydrocarbon content, the method comprising the following steps:

upstream cooling and partial condensation of a stream of raw cracked gas by at least partial heat exchange with a coolant fluid circulating in a first external refrigeration cycle and separation of an upstream liquid in at least one upstream drum to form an intermediate stream of cracked gas pre-cooled to a first temperature;

intermediate cooling and partial condensation of the intermediate stream of cracked gas in at least one intermediate heat exchanger and separation of an intermediate liquid in at least one intermediate separation drum to form a downstream stream of cracked gas cooled to a second temperature lower than the first temperature;

downstream cooling and partial condensation of the downstream stream of cracked gas in at least one downstream heat exchanger to a third temperature lower than the second temperature;

introducing the partially condensed downstream stream of cracked gas from the downstream heat exchanger in a downstream separator;

recovering, at the head of the downstream separator, a high-pressure gas stream of fuel, with a low $C_2^+$ hydrocarbon content, and recovering, at the bottom of the downstream separator, a downstream liquid, with a high $C_2^+$ hydrocarbon content;

passing the high-pressure fuel stream through the downstream exchanger and the intermediate exchanger to form a heated high-pressure fuel stream;

expansion of the heated high-pressure fuel stream in at least a first dynamic expander to obtain a partially expanded fuel stream;

heating the partially expanded fuel stream through the downstream exchanger and the intermediate exchanger;

processing at least one liquid obtained during the upstream cooling, intermediate cooling and downstream cooling steps to form the ethylene-rich cut.

The cracked gas comes from a hydrocarbon pyrolysis installation such as a steam cracking furnace. The gas introduced into the pyrolysis installation advantageously has at least 70% ethane, combined with propane, butane, naphtha, and/or diesel fuel.

The method of the aforementioned type is intended to process the cracked gas to obtain an ethylene cut having an ethylene content higher than 99.95 mole %, recovering more than 99.5 mole % of the ethylene contained in the cracked gas.

A method of the aforementioned type that makes it possible to obtain such performance levels is for instance described in EP 1 215 459.

This method is intended to be implemented to process very large volumes of cracked gas, for example greater than 50 tons, in particular greater than 100 tons per hour.

To guarantee both a very high purity of the ethylene stream produced and a maximum ethylene recovery rate, it is necessary to cool the processed gas to temperatures below −100° C. and in particular below −120° C.

To that end, the stream of cracked gas is in heat exchange communication successively with propylene circulating in a first external refrigeration cycle, then with ethylene circulating in a second external refrigeration cycle.

The refrigeration cycle with ethylene generally comprises three heat levels, with a first heat exchanger at about −50° C., a second heat exchanger at about −75° C. and a third heat exchanger at about −100° C.

After each heat exchange, the partially condensed cracked gas is introduced into a separator to evacuate the liquid formed.

The collected liquids, which generally have high $C_2^+$ hydrocarbon contents, are sent towards a processing unit including at least one fractionating column. The fractionating column produces the stream containing the ethylene recovered by the cryogenic method.

Given the use of two refrigeration cycles and an ethylene-based cycle with three heat levels, the energy consumption of the method can be further improved.

One aim of the invention is therefore to obtain, with a lower investment, in particular by suppressing a thermal level provided by a refrigeration cycle, a fractionating method that still makes it possible to recover a stream with a high content of ethylene, with a very high recovery rate, while having improved energy efficiency.

To that end, the invention concerns a method of the aforementioned type, characterized in that the method comprises the following steps:

passage of the partially expanded flow of fuel from the intermediate exchanger into a second dynamic expander to form an expanded stream of fuel;

reheating the expanded fuel stream obtained from the second dynamic expander in the downstream heat exchanger and in the intermediate heat exchanger;

compressing the reheated expanded fuel stream in at least one compressor coupled to at least one turbo-expander of the first dynamic expander and/or the second dynamic expander to form the stream of fuel having a low $C_2^+$ hydrocarbon content.

The method according to the invention can comprise one or several of the following features, considered separately or according to all technically possible combinations:

the thermal power needed to cool the intermediate stream of cracked gas towards the second temperature is provided in the intermediate heat exchanger by heat exchange with the high-pressure fuel stream, by heat exchange with the partially expanded fuel stream and by heat exchange with the expanded fuel stream, without heat exchange with an external coolant fluid circulating in a refrigeration cycle;

the method comprises the recovery of the downstream liquid and its reheating through the downstream heat exchanger, and the intermediate heat exchanger;

the downstream liquid is sub-cooled in the downstream heat exchanger before it is reheated in the downstream heat exchanger, then in the intermediate heat exchanger;

at least a fraction of an intermediate liquid recovered in the intermediate cooling step is reheated in the downstream heat exchanger and in the intermediate heat exchanger;

the fraction of the intermediate liquid recovered in the intermediate cooling step is sub-cooled in the downstream heat exchanger before being reintroduced into the downstream heat exchanger, then in the intermediate heat exchanger;

at least one of the at least one fraction of the intermediate liquid and the downstream liquid evaporates during its passage in the downstream heat exchanger and in the intermediate heat exchanger to form a gas recirculation flow, the recirculation flow being mixed with the stream of raw cracked gas, before the passage of the raw cracked gas in the at least one compressor;

the processing step comprises the introduction of at least one stream formed from said upstream liquid, intermediate liquid and/or downstream liquid in a fractionating column and the production in the fractionating column of a stream with a high ethylene content intended to form the ethylene-rich cut;

in the processing step, the upstream liquid and the intermediate liquid are introduced into the fractionating column;

the overhead stream from the fractionating column is conveyed towards the upstream heat exchanger and advantageously towards an upstream reheating exchanger, before being mixed with the raw cracked gas;

the first dynamic expander and the second dynamic expander each comprise at least one dynamic turbo-expander, advantageously each comprise between two and three dynamic turbo-expanders;

the molar content of hydrogen in the high pressure fuel stream is greater than 75%; and the first temperature is below −63° C., the second temperature is below −85° C., and the third temperature is below −120° C.

The invention also concerns an installation for fractionating a stream of cracked gas from a hydrocarbon pyrolysis installation to obtain an ethylene-rich cut and a stream of fuel having a low $C_2^+$ hydrocarbon content, the installation comprising:

upstream means for cooling and partial condensation of a stream of raw cracked gas including at least partial heat exchange means with a first external refrigeration cycle and means for separating an upstream liquid including at least one upstream drum to form an intermediate stream of cracked gas pre-cooled to a first temperature;

intermediate means for cooling and partial condensation of the intermediate stream of cracked gas including at least one intermediate heat exchanger and means for separating an intermediate liquid including at least one intermediate separation drum to form a downstream stream of cracked gas cooled to a second temperature lower than the first temperature;

downstream means for cooling and at least partial condensation of the downstream stream of cracked gas including at least one downstream heat exchanger to cool the downstream stream of cracked gas to a third temperature lower than the second temperature;

a downstream separator and means for introducing the downstream stream of cracked gas from the downstream heat exchanger in the downstream separator;

means for recovering, at the head of the downstream separator, a high-pressure gas stream of fuel, with a low $C_2^+$ hydrocarbon content, and means for recovering, at the bottom of the downstream separator, a downstream liquid, with a high $C_2^+$ hydrocarbon content;

means for passing the high pressure fuel stream through the downstream exchanger and the intermediate exchanger to form a reheated high-pressure fuel stream;

means for expanding the reheated high-pressure fuel stream including at least a first dynamic expander to form a partially expanded fuel stream;

means for reheating the partially expanded fuel stream through the downstream exchanger and the intermediate exchanger;

means for processing at least one liquid obtained from the upstream cooling means, intermediate cooling means and downstream cooling means to form the ethylene-rich cut;

characterized in that the installation comprises:

a second dynamic expander and means for passage of the partially expanded stream of fuel from the intermediate exchanger into the second dynamic expander to form an expanded stream of fuel;

means for reheating the expanded fuel stream from the second dynamic expander in the downstream heat exchanger and in the intermediate heat exchanger; and means for compressing the reheated expanded fuel stream in at least one compressor coupled to at least one turbo-expander of the first dynamic expander and/or the second dynamic expander to form the stream of fuel having a low $C_2^+$ hydrocarbon content.

BRIEF DESCRIPTION OF THE DRAWINGS

The invention will be better understood upon reading the following description, provided solely as an example and done in reference to the appended drawings, in which:

The sole FIGURE is a functional synoptic diagram of a first fractionating installation according to the invention, intended to be implemented using a first method according to the invention.

DETAILED DESCRIPTION OF THE INVENTION

In the following, a same reference designates a stream circulating in a hose and the hose that transports that stream. Moreover, unless otherwise indicated, the percentages are molar percentages and pressures are expressed in relative bars.

A first steam cracking unit 10 according to the invention is shown in FIG. 1.

This unit 10 is intended to form an ethylene-rich cut 12 and a fuel gas stream with a low $C_2^+$ hydrocarbon content, from a charge 16.

The unit 10 comprises a hydrocarbon pyrolysis installation 18 including a steam cracking furnace intended to produce a stream 20 of raw cracked gas. It also includes a fractionating installation 22 of the raw processed gas to form the fuel gas stream 14 and the ethylene-rich cut 12.

The charge 16 is advantageously made up of at least 70 mole % of ethane, in combination with propane, butane, naphtha and/or diesel fuel.

The steam cracking furnace 18 is able to circulate the charge 16 to heat it to a temperature above 800° C. This causes the heat cracking of the hydrocarbon molecules contained in the charge 16 in order to form the raw cracked gas stream 20.

The fractionating installation 22 successively includes a cooling and compression assembly 24, and an upstream assembly 26, a downstream assembly 28 and an intermediate assembly 30 for cooling and separating the cracked gas.

The installation 22 also includes an assembly 32 for processing the liquids formed in the assemblies 26 to 30, and an expansion and reheating assembly 34 for the combustible gas.

The compression assembly 24 includes a cooling step and a primary compressor 36 and a second compressor 38, the secondary compressor being positioned downstream of the primary compressor 36.

The upstream cooling and separation assembly 26 includes a first upstream separating drum 40, an upstream heat exchanger 42, an ethylene refrigeration cycle 44, and a second upstream separating drum 46.

The ethylene cycle 44 includes two heat exchangers with cycle 48A, 48B in which the ethylene circulates. The inlet temperature of the ethylene is less than −45° C., advantageously between −45° C. and −60° C. in the exchanger 48A, and is below −65° C. and in particular between −65° C. and −80° C. in the exchanger 48B. The exchangers 48A and 48B can be integrated in the upstream heat exchanger 42.

The intermediate cooling and separating assembly 28 includes, from upstream to downstream, a first intermediate heat exchanger 50, a first intermediate separating drum 52, then a second intermediate heat exchanger 54, and a second intermediate separating drum 56.

The downstream cooling and separating assembly 30 comprises a downstream heat exchanger 58, and a downstream separating drum 60 intended to produce the combustible gas stream.

The assembly 32 for processing the liquids includes a fractionating column 62, a reboiling heat exchanger 64, and a pump 66 at the bottom of the column.

The expander and reheating assembly 34 comprises a first dynamic expander device 68, a second dynamic expander device 70, the devices 68, 70 each having at least one dynamic turbo-expander 68A, 70A.

The expander and reheating assembly 34 also includes a reheating heat exchanger 72, a first compression device 74 and a second compression device 75, the devices 74 and 75 each having at least one compressor 74A and 75A, which are each coupled to a respective turbo-expander 68A, 70A of the first dynamic expander 68 and the second dynamic expander 70.

The reheating heat exchanger 72 cools a coolant fluid circulating in a propylene refrigeration cycle 78. The propylene cycle 78 includes a bottom heat exchanger 80 placed downstream of the pump 66 at the bottom of the column. The exchanger 80 can be integrated into the exchanger 42.

A first method according to the invention, implemented in the unit 10 to process the cracked gas stream from the steam cracking of a charge 16, will now be described.

Initially, the charge 16 containing mainly ethane is introduced into the steam cracking furnace 18 to be heated to a temperature above 800° C. and to undergo heat cracking.

A raw cracked gas stream 20 is removed from the furnace 18 at a temperature above 800° C. and at a pressure above 1 bar.

This stream 20 is then cooled and introduced into the primary compressor 36 to be compressed at a pressure greater than 10 bars substantially lower than the pressure in the fractionating column 62, then in the secondary compressor 38 to be compressed at a pressure greater than 30 bars.

The compressed cracked gas stream 90 from the secondary compressor 38 is then separated in a first reboiling fraction 92 and a second fraction 94.

The reboiling fraction 92 is introduced into the heat exchanger 64 at the bottom of the column to be cooled and partially condensed there. The second fraction 94 is passed through a first flow rate control valve 96, before being mixed with the reboiling fraction 92 from the exchanger 64 to form a partially condensed cracked gas stream 98.

In one alternative of the method, the stream of cracked gas 90 can advantageously circulate, in part or in whole, through the reheating heat exchanger 72 before the separation into the flows 92 and 96, in order to cool in the exchanger 72.

The molar ratio of the first reboiling fraction 92 to the second fraction 94 is between 5% and 20%. The partially condensed stream of cracked gas 98 contains at least 15 mole % of liquid. It has a temperature below −30° C.

Then, the stream 98 is introduced into the first upstream separating drum 40 to form a first upstream liquid 100 and an upstream stream of cracked gas 102.

The first upstream liquid 100 is withdrawn in the bottom of the first separator drum 40 and is introduced at a lower level N1 of the fractionating column 62, after passage and expansion in a second flow rate control valve 104.

The pressure in the fractionating column 62 is advantageously between 10 bars and 14 bars.

The upstream current 102 is then separated into a first gas flow 106 of cracked gas and a second gas flow 108 of cracked gas. The ratio of the molar flow rate of the first flow 106 to the molar flow rate of the upstream stream 102 is greater than 8%.

The first flow 106 is cooled to a temperature below −63° C. and in particular substantially between −63° C. and −78° C. in the upstream heat exchanger 42.

The second gas flow 108 is successively introduced in the first heat exchanger of cycle 48A to be cooled to a temperature below −43° C. by heat exchange with the ethylene circulating in the cycle 44. Then, it is introduced in the second heat exchanger of cycle 48B to be cooled to a temperature below −63° C., and in particular between −63° C. and −78° C.

After cooling, the flows 106 and 108 are mixed and form a partially condensed upstream stream 110 of cracked gas that is introduced into the second upstream separator drum 46.

The molar content of liquid in the upstream stream of partially condensed cracked gas 110 is between 30% and 60%. In the second upstream separating drum 46, the current 110 separates into a second upstream liquid 112 and a first intermediate gas stream 114 of cracked gas cooled to a first temperature below −63° C.

The second upstream liquid 112 is recovered at the bottom of the second upstream separating drum 46. It forms the stream 113 after passage and expansion in a third flow rate control valve 116 and is introduced at a level N2 of the fractionating column 62 situated above the level N1.

The first intermediate stream 114 of cracked gas is introduced into the intermediate heat exchanger 50 to be cooled there to a temperature below −85° C. and form an intermediate partially condensed stream 118 of cracked gas. The stream 118 has a temperature below −85° C., and a liquid content between 8 mole % and 30 mole %.

The stream 118 is then introduced into the first intermediate separating drum 52 to form a first intermediate liquid 120 and a second intermediate gas stream 122 of cracked gas.

The first intermediate liquid 120 is recovered at the bottom of the drum 52. It forms the stream 121, after passage and expansion through a fourth flow rate control valve 124, before being introduced at a third level N3 of the fractionating column 62, situated above the level N2.

In one alternative of the method, the streams 113 and 121 can be combined before supplying the fractionating column 62.

The second intermediate gas flow 122 is then introduced into the second intermediate heat exchanger 54 to be cooled there to a second temperature below −105° C. and between −105° C. and −120° C.

At the outlet of the second intermediate heat exchanger 54, the second partially condensed intermediate flow 126 is introduced into the second intermediate separating drum 56 to be separated there into a second intermediate liquid 128 and a downstream stream of cracked gas 130.

A first fraction 132 of the second intermediate liquid 128 is introduced at a level N4 of the fractionating column 62 situated above the level N3, after passage and expansion in a fifth flow rate control valve 134. A second fraction 136 for recirculation of the second intermediate liquid 128 is sub-cooled in the downstream heat exchanger 58, as will be seen below.

The downstream stream of cracked gas 130 is then introduced into the downstream heat exchanger 58 to be cooled there and form a downstream stream 140 of partially condensed cracked gas. The temperature of the stream 140, at the outlet of the downstream heat exchanger 58, is below −125° C. and is in particular between −125° C. and −140° C.

The stream 140 is then introduced into the downstream separating drum 60 to be separated there into a downstream liquid 142 and a high-pressure combustible gas stream 144 intended to be expanded. The combustible gas stream 144 includes more than 75 mole % of hydrogen and less than 0.5 mole % of $C_2^+$ hydrocarbons.

The stream 144 is introduced a first time into the downstream heat exchanger 58 to be reheated by counter-current heat exchange with the downstream stream 130 of cooled cracked gas, then in the second intermediate heat exchanger 54 to be reheated by counter-current in particular relative to the second intermediate stream 122 of cracked gas, up to a temperature greater than −110° C.

It is then introduced into the first downstream heat exchanger 50 to be reheated there by heat exchange with the first intermediate stream of cracked gas 114 up to a temperature greater than −85° C.

The high-pressure combustible gas stream 146 reheated to a temperature above −85° C. is then introduced into a dynamic turbo-expander 68A of the first dynamic expander 68 to be expanded to a pressure lower than 12 bars and form an intermediate pressure stream 148 of combustible gas.

The temperature of the stream 148 is below −115° C. The stream 148 is then reintroduced into the downstream heat exchanger 58, in the second intermediate heat exchanger 54, then in the first intermediate heat exchanger 50 to be reheated successively by heat exchange with the stream 130, the stream 122 and the stream 114, respectively, as described above. This passage of the stream 148 through the exchangers 50, 54, 58 is done between a turbine 68A of the first device 68 and a turbine 70A of the second device 70.

The intermediate-pressure reheated combustible gas stream 150 is next introduced into a dynamic turbo-expander 70A of the second dynamic expander device 70 to be expanded there at a pressure below 4 bars and form a cooled low-pressure combustible gas stream 152.

The temperature of the stream 152 is then below −115° C., and its pressure is below 4 bars.

The stream 152 is then successively introduced into the downstream heat exchanger 58, the second intermediate heat exchanger 54, then in the first heat exchanger 50 to be reheated there counter-current to the stream 130, the stream 122, and the stream 114, respectively, as described above.

The reheated low-pressure combustible gas stream 154 from the first intermediate heat exchanger 50 is then successively introduced into the upstream heat exchanger 42 to be placed in heat exchange communication with the first gas flow 106 from the first gas stream of cracked gas 102, then in the reheating heat exchanger 72.

In the reheating heat exchanger 72, the stream 154 is reheated by heat exchange with the polypropylene coolant fluid 156 circulating in the refrigeration cycle 78.

The low-pressure reheated combustible gas stream 160 from the exchanger 72 thus has a pressure close to the atmospheric pressure.

The stream 160 is next successively introduced into the compressor 75A of the second compression device 75, then the compressor 74A of the downstream compression device 74 to form the combustible stream 14 intended to supply the installation's grid. The pressure of the stream 14 is greater than 5 bars.

The ethylene content in the high-pressure combustible gas 144, as in the combustible gas 14, is lower than 0.5 mole %. The ethylene recovery rate in the installation is greater than 99.5%.

The fuel stream 14 advantageously comprises more than 99% methane contained in the stream of raw cracked gas 20.

The downstream liquid 142 includes more than 25 mole % of $C_2^+$ hydrocarbons. It is introduced into the downstream heat exchanger 58 to be sub-cooled there to a temperature below −120° C.

After their passage in the exchanger 58, the liquids 136, 142 are mixed and are successively introduced into the heat exchangers 58, 54, 50, 42 and 72 to be reheated and evaporate by heat exchange with the respective streams circulating in those exchangers.

They then form a reheated recycling gas stream 162 that has a temperature above 10° C. The gas stream 162 is reintroduced into the stream of raw cracked gas 20, in the primary compressor 36. In one alternative of the method, the liquids 136 and 142 are introduced separately into the heat exchangers 58, 54, 50, 42, 72 to be reheated, before being reintroduced into the stream of raw cracked gas 20.

The fractionating column 62 produces a methane-rich overhead stream 164 and an ethylene-rich bottoms stream 166.

The overhead stream 164 is introduced, after reheating in the upstream heat exchanger 42, then after reheating in the reheating heat exchanger 72, in the stream of raw cracked gas 20, between the primary compressor 36 and the secondary compressor 38.

The bottoms stream 166 from the fractionating column 62 is pumped by the pump 66, before being introduced into the recovery heat exchanger 80 (which can be integrated into the exchanger 72). It is then reheated in contact with the propylene forming the coolant fluid for the cycle 78. After passage in the exchanger 80, the ethylene-rich cut 12 is formed. This cut 12 includes more than 99.5 mole % of the ethylene contained in the stream of raw cracked gas 20.

According to the invention, the intermediate stream of cracked gas 114 that is cooled to a temperature below −63° C. owing to the refrigeration provided by the ethylene cycle 44, is then cooled to a temperature below −90° C. exclusively by heat exchange with the high-pressure combustible gas stream 144, with the partially expanded combustible gas stream 148 and with the expanded combustible gas stream 152, and by reheating of the liquids 142, 136 from the drums 56, 60, in the heat exchangers 50, 54, and 58.

It is therefore not necessary to provide for an ethylene refrigeration cycle 44 including a heat level at −100° C. (usually between −95° C. and −102° C.), between the upstream drum 46 and the downstream drum 60. This decreases the energy consumption of the method and the investment necessary to implement it.

Thus, the appropriate use of the high expansion and calorific capacity potential of the high-pressure combustible gas 144 formed at the outlet of the downstream drum 60, due to its high hydrogen content, makes it possible to greatly decrease the energy consumption of the method. It is thus possible to decrease, by at least 30 KWh per ton of ethylene produced per hour, the specific refrigeration power in relation to a unit known from the prior art, while keeping an ethane recovery rate greater than 99.5% and producing an ethylene-rich cut 12.

This result is obtained by decreasing the necessary investment for the installation, since it is no longer necessary to provide a specific compressor and a specific heat exchanger for a heat level at −100° C. in the ethylene cycle 44.

In one alternative, each dynamic expander device 68 comprises a plurality of dynamic turbo-expanders, for example 2 to 3 dynamic turbo-expanders. In another alternative, an additional compressor is placed downstream of the compressors 76A, 76B to compress the combustible gas 14 at a higher pressure.

In other alternatives, the processing unit comprises a plurality of fractionating columns as described for example in EP 1 215 459.

It will be noted that, as shown in the sole FIGURE, the entire high-pressure fuel stream 144 is reheated successively in the downstream heat exchanger, and in the intermediate heat exchangers 50, 54, before being completely introduced into the first dynamic expander 68.

Likewise, the entire partially expanded fuel stream 148 obtained from the first dynamic expander 68 is successively passed in the downstream exchanger 58 and the intermediate exchangers 50, 54, before being introduced in whole in the second dynamic expander 70. All of the expanded fuel stream 152 from the second dynamic expander 70 is then introduced in the downstream heat exchanger 58 and in the intermediate heat exchangers 50, 54.

Thus, recovery of the frigories is maximal to allow cooling of the gas.

It will also be noted that the drums 40, 46 and 52, 56 and 60 are simple separating drums, and not fractionating towers. Thus, these drums do not have plates or trim.

The fractionating column is a strippe column. Thus, the methane-rich overhead stream 164 from the column 62 is completely returned into the raw cracked gas 20, without a fraction of that stream 164 being condensed to be sent to the column 62 as a reflux.

Moreover, the thermal power needed to cool the downstream stream of cracked gas 130 towards the third temperature is provided in the downstream heat exchanger 58 by heat exchange with the high-pressure fuel stream 144, by heat exchange with the partially expanded fuel stream, and by heat exchange with the expanded fuel stream 152, without heat exchange with an external coolant fluid circulating in a refrigeration cycle, and in particular without heat exchange with the coolant fluid circulating in the refrigeration cycle 44.

As shown above, it is therefore not necessary to provide the cycle 44 with a refrigeration step at a temperature in the vicinity of −100° C., and in particular between −85° C. and −102° C.

What is claimed is:

1. A method for fractionating a stream of cracked gas from a hydrocarbon pyrolysis installation to obtain an ethylene-rich cut and a stream of fuel having a low $C_2^+$ hydrocarbon content, the method comprising the following steps:

cooling and introducing in at least one compressor a raw cracked gas stream to form a compressed cracked gas stream;

forming a reboiling fraction from the compressed cracked gas stream;

introducing the reboiling fraction into a reboiling heat exchanger of a fractionating column;

partial condensing of the reboiling fraction in the reboiling heat exchanger;

introducing a stream foiined from the reboiling fraction into a first upstream separating drum to form an upstream stream of raw cracked gas;

upstream cooling of the upstream stream of raw cracked gas and partial condensation of the upstream stream of raw cracked gas by at least partial heat exchange with a coolant fluid circulating in a first external refrigeration cycle and separation of an upstream liquid in an upstream drum to form an intermediate stream of cracked gas pre-cooled to a first temperature below −63° C.;

intermediate cooling of the intermediate stream of cracked gas and partial condensation of the inteiiiiediate stream of cracked gas in at least one intermediate heat exchanger and separation of an intermediate liquid in at least one intermediate separation drum to form a downstream stream of cracked gas cooled to a second temperature lower than the first temperature;

downstream cooling of the downstream stream of cracked gas and partial condensation of the downstream stream of cracked gas in a downstream heat exchanger to a third temperature lower than the second temperature;

introducing the partially condensed downstream stream of cracked gas obtained from the downstream heat exchanger in a downstream separator;

recovering, at the head of the downstream separator, a high-pressure gas stream of fuel, with a low $C_2^+$ hydrocarbon content, and recovering, at the bottom of the downstream separator, a downstream liquid, with a high $C_2^+$ hydrocarbon content;

passing the high-pressure fuel stream through the downstream exchanger and the at least one intermediate exchanger to form a reheated high-pressure fuel stream;

expansion of the reheated high-pressure fuel stream in at least a first dynamic expander to obtain a partially expanded fuel stream;

heating the partially expanded fuel stream through the downstream exchanger and the at least one intermediate exchanger;

passing the partially expanded flow of fuel from the at least one intermediate exchanger into a second dynamic expander to form an expanded stream of fuel;

reheating the expanded fuel stream from the second dynamic expander in the downstream heat exchanger and in the at least one intermediate heat exchanger;

compressing the reheated expanded fuel stream in at least one fuel compressor coupled to at least one turbo-expander of one of the first dynamic expander and the second dynamic expander to form the stream of fuel having a low $C_2^+$ hydrocarbon content, wherein the intermediate cooling of the intermediate stream of cracked gas to the second temperature is carried out exclusively by heat exchange with the high pressure fuel stream, by heat exchange with the partially expanded fuel stream, by heat exchange with the expanded fuel stream, by heat exchange with a first fraction of the intermediate liquid recovered in the intermediate cooling step and the downstream liquid recovered in the downstream cooling step from the downstream separator, the heat exchanges being carried out in the intermediate heat exchanger, without heat exchange with an external coolant fluid circulating in a refrigeration cycle, wherein a processing step comprises the introduction of at least said upstream liquid, and a second fraction of said intermediate liquid in a fractionating column and the production in the fractionating column of a stream with a high ethylene content intended to form the ethylene-rich cut.

2. The method according to claim 1, further comprising recovery of the downstream liquid and reheating thereof through the downstream heat exchanger, and the intermediate heat exchanger, the downstream liquid being sub-cooled in the downstream heat exchanger before it is reheated in the downstream heat exchanger, then in the intermediate heat exchanger.

3. The method according to claim 1, wherein the first fraction of the intermediate liquid is sub-cooled before being reintroduced into the downstream heat exchanger, then in the intermediate heat exchanger.

4. The method according to claim 1, wherein the first fraction of the intermediate liquid and the downstream liquid evaporates during passage in the downstream heat exchanger, and passage in the intermediate heat exchanger to provide the intermediate cooling of the intermediate stream of cracked gas, to form a gas recirculation flow, the gas recirculation flow being mixed with the stream of raw cracked gas, before the passage of the raw cracked gas in the at least one compressor.

5. The method according to claim 1, wherein the entirety of the overhead stream from the fractionating column is conveyed through the upstream heat exchanger.

6. The method according to claim 1, wherein the first dynamic expander comprises at least one dynamic turbo expander, and the second dynamic expander comprises at least one dynamic turbo-expander.

7. The method according to claim 1, wherein the molar content of hydrogen in the high-pressure fuel stream is greater than 75%.

8. The method according to claim 1, wherein the first temperature is below −63° C., the second temperature is below −85° C., and the third temperature is below −120° C.

9. The method according to claim 1, wherein the entirety of the overhead stream from the fractionating column is conveyed through the upstream heat exchanger, before being mixed with the raw cracked gas, without a fraction of the overhead stream being condensed to be sent to the fractionating column as reflux.

* * * * *